(12) United States Patent
Chen et al.

(10) Patent No.: US 10,860,456 B2
(45) Date of Patent: Dec. 8, 2020

(54) COUNTING CIRCUIT OF PERFORMANCE MONITOR UNIT

(71) Applicant: REALTEK SEMICONDUCTOR CORPORATION, Hsinchu (TW)

(72) Inventors: Chia-I Chen, Hsinchu County (TW); Yenting Tsai, Hsinchu County (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 175 days.

(21) Appl. No.: 16/276,792

(22) Filed: Feb. 15, 2019

(65) Prior Publication Data

US 2019/0303264 A1 Oct. 3, 2019

(30) Foreign Application Priority Data

Mar. 27, 2018 (TW) .............................. 107110414 A

(51) Int. Cl.
*G06F 11/34* (2006.01)

(52) U.S. Cl.
CPC ...... *G06F 11/3495* (2013.01); *G06F 11/3409* (2013.01); *G06F 2201/86* (2013.01); *G06F 2201/88* (2013.01)

(58) Field of Classification Search
CPC ............... G06F 11/3409; G06F 11/348; G06F 11/3495; G06F 2201/86; G06F 2201/88
See application file for complete search history.

(56) References Cited

U.S. PATENT DOCUMENTS

| 5,557,548 | A | * | 9/1996 | Gover | ................... | G06F 11/348 |
| | | | | | | 702/176 |
| 5,615,135 | A | * | 3/1997 | Waclawsky | ........... | G06F 11/348 |
| | | | | | | 702/182 |
| 6,442,704 | B1 | | 8/2002 | Morimoto et al. | | |
| 6,629,256 | B1 | * | 9/2003 | Ilan | ........................... | H03L 7/00 |
| | | | | | | 713/500 |
| 7,216,250 | B2 | | 5/2007 | Matsuoka et al. | | |
| 7,225,105 | B2 | | 5/2007 | Mericas | | |
| 10,416,703 | B2 | * | 9/2019 | Sheafor | ............... | G06F 13/4291 |

OTHER PUBLICATIONS

OA letter of counterpart TW application of application No. 107110414 mailed on Jan. 18, 2019. Summary of the OA letter: Claims 1-10 are rejected as being unpatentable over the cited reference 1 (U.S. Pat. No. 6,442,704) and the cited reference 2 (U.S. Pat. No. 7,216,250).

* cited by examiner

*Primary Examiner* — Patrick O Neill
(74) *Attorney, Agent, or Firm* — WPAT, PC

(57) ABSTRACT

The present invention discloses a counting circuit of a performance monitor unit, capable of preventing a cycle counter from being suspended due to the occurrence of an overflow. An embodiment of the counting circuit includes a cycle counter and an event counter. The cycle counter starts counting from a beginning number according to a cycle of a clock signal during enablement duration, and when a count of the cycle counter reaches a count maximum of the cycle counter during the enablement duration, the cycle counter changes a level of a trigger signal and then counts from the beginning number again. The event counter counts according to change of the level of the trigger signal. Accordingly, the counting circuit is operable to obtain a total cycle number of the clock signal in the enablement duration according to the count of the cycle counter and a count of the event counter.

18 Claims, 4 Drawing Sheets

COUNTING CIRCUIT OF PERFORMANCE MONITOR UNIT

BACKGROUND OF THE INVENTION

1. Field of the Invention

The present invention relates to a counting circuit, especially to a counting circuit of a performance monitor unit.

2. Description of Related Art

A performance monitor unit (PMU) is usually used to acquire the performance information of a processor. The performance information can be the basis for improving the performance of the processor or optimizing the instructions the processor executes. The PMU usually counts according to a cycle of a clock of the processor within specific duration (e.g., the duration for executing specific operation). This count operation can be carried out by a dedicated counter. However, since the frequency of the clock of the processor could be extremely high, the dedicated counter easily reaches its count maximum before the end of the specific duration and thus an overflow easily occurs. In order to cope with the overflow of the dedicated counter, the count of the dedicated counter should be adjusted and the occurrence of the overflow should be recorded. Until the said adjustment and the said recordation are finished, the dedicated counter is suspended, and this will affect the result of the count operation carried out by the dedicated counter; in other words, the result of the count operation will be inaccurate.

A current art is found in the following literature: U.S. Pat. No. 7,225,105 B2.

SUMMARY OF THE INVENTION

The present invention discloses a counting circuit of a performance monitor unit (PMU) to prevent the problem of the prior art.

According to an embodiment of the present invention, the counting circuit of the PMU includes a cycle counter and an event counter. The cycle counter is configured to start counting from a beginning number according to a cycle of a clock signal during enablement duration, wherein when a count of the cycle counter reaches a count maximum of the cycle counter during the enablement duration, the cycle counter is configured to change a level of a trigger signal and then count from a predetermined number (e.g., zero). The event counter is configured to count according to change of the level of the trigger signal during the enablement duration so that the counting circuit is operable to obtain a total cycle number of the clock signal in the enablement duration according to the count of the cycle counter and a count of the event counter.

According to another embodiment of the present invention, the counting circuit of the PMU includes a cycle counter, a first event counter and a second event counter. The cycle counter is configured to start counting from a beginning number according to a cycle of a clock signal during enablement duration, wherein when a count of the cycle counter reaches a count maximum of the cycle counter, the cycle counter is configured to change a level of a trigger signal and then count from a predetermined number (e.g., zero). The first event counter is configured to start counting from a first number according to the trigger signal during the enablement duration, wherein when a count of the first event counter reaches a count maximum of the first event counter, the first event counter is configured to change a level of a first signal and then count from another predetermined number (e.g., zero). The second event counter is configured to start counting from a second number according to the first signal during the enablement duration so that the counting circuit is operable to obtain a total cycle number of the clock signal in the enablement duration according to the count of the cycle counter, the count of the first event counter and a count of the second event counter.

According to a further embodiment of the present invention, the counting circuit of the PMU includes a cycle counter, a multiplexer and an event counter. The cycle counter is configured to count according to a cycle of a clock signal and output a trigger signal to the multiplexer. The multiplexer is configured to receiver at least one event signal and the trigger signal and output one of the trigger signal and the at least one event signal to an event counter according to a selection signal. The event counter is configured to operate in a manner independent of the cycle counter when the multiplexer outputs any of the at least one event signal, and the event counter is configured to count according to change of a level of the trigger signal when the multiplexer outputs the trigger signal. In light of the above, the event counter can operate according to the trigger signal outputted by the cycle counter or operate according to one of the at least one event signal and thus the usage of the event counter is flexible.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

The present invention discloses a counting circuit of a performance monitor unit (PMU). The counting circuit is capable of counting according to a cycle of a clock signal of a target circuit (e.g., a processor or a clock generator) and preventing the suspension of the count operation caused by the overflow of the counting circuit; therefore, the counting circuit can provide an accurate result of the count operation. The above-mentioned clock signal could be the signal generated or received by the target circuit.

Figure 1:
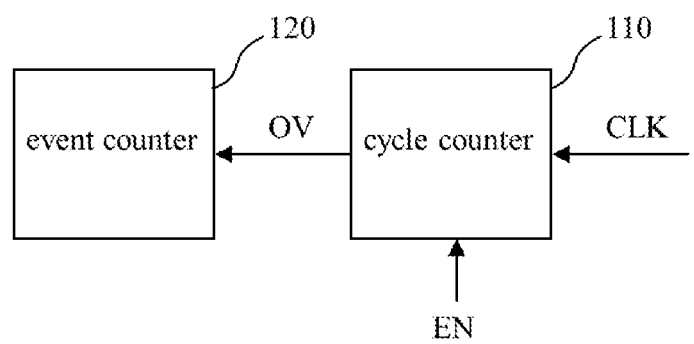
FIG. 1 shows the counting circuit of the PMU according to an embodiment of the present invention.

FIG. 1 shows an embodiment of the counting circuit of the present invention. The counting circuit 100 of FIG. 1 includes a cycle counter 110 and an event counter 120. The cycle counter 110 and the event counter 120 are connected in a predetermined manner (e.g., in series). An embodiment of the cycle counter 110 is an N-bit counter and an embodiment of the event counter 120 is an M-bit counter, in which both the N and the M are positive integers that are associated with the count maximum of the cycle counter 110 (e.g., $2^N-1$) and the count maximum of the event counter 120 (e.g., $2^M-1$) respectively. In an exemplary implementation, the N is not less than 32, and the M is not less than 16 but less than the N. In another exemplary implementation, the N is 32 and the M is 16. It should be noted that the counting circuit 100 can optionally include one or more additional counters (e.g., other event counters) for more kinds of utilization.

Please refer to FIG. 1. The cycle counter 110 receives at least one enabling signal EN which defines enablement duration (e.g., duration for finishing a specific operation). The cycle counter 110 is configured to start counting from a beginning number (e.g., any of a 32-bit value such as the minimum of the 32-bit value) according to a cycle of a clock signal CLK during the enablement duration. When a count of the cycle counter 110 reaches a count maximum of the cycle counter 110 (e.g., the maximum of a 32-bit value) during the enablement duration, the cycle counter 110 is configured to change a level of a trigger signal OV and then count from a predetermined number (e.g., zero). The event counter 120 is configured to count according to change of the level of the trigger signal OV during the enablement duration; for instance, if the level of the trigger signal OV changes once (e.g., either from low level to high level or from high level to low level), the increment of the count of the event counter 120 is one. Accordingly, the counting circuit 100 is operable to obtain a total cycle number of the clock signal CLK in the enablement duration according to the count of the cycle counter 110 and the count of the event counter 120; for instance, providing the count maximum of the cycle counter 110 is $CYCT_{MAX}$ and both the beginning number and the predetermined number are zero, at the end of the enablement duration the total cycle number $CLK_{TOTAL\#}$ of the clock signal CLK is equal to "the count of the cycle counter 110 (i.e., $CYCT_{CNT}$)" plus "the count of the event counter 120 (i.e., $EV_{CNT}$) times the maximum count of the cycle counter 110 (i.e., $CYCT_{MAX}$)", that is to say $CLK_{TOTAL\#}=CYCT_{CNT}+EV_{CNT}\times CYCT_{MAX}$. It should be noted that the cycle counter 110 and the event counter 120 can be reset in response to the end of the enablement duration and prepared for the next count operation.

Figure 2:
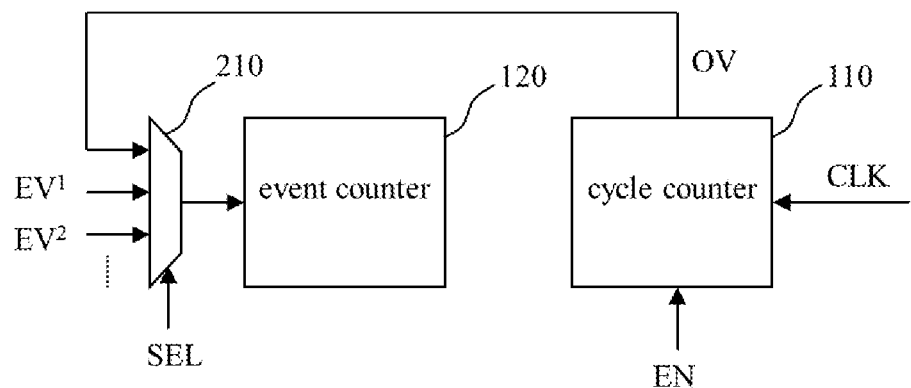
FIG. 2 shows the counting circuit of the PMU according to another embodiment of the present invention.

Please refer to FIG. 1. In some circumstances, the total cycle number of the clock signal CLK in the enablement duration is likely to exceed the count maximum of the cycle counter 110; in the meantime the cycle counter 110 and the event counter 120 can cooperate to count so as to prevent the overflow of the cycle counter 110 from causing problems. In some circumstances, the total cycle number of the clock signal CLK in the enablement duration is unlikely to exceed the count maximum of the cycle counter 110 or the event counter 120 has been assigned to other operation; in the meantime, the cycle counter 110 and the event counter 120 operate separately and the overflow of the cycle counter 110 will be handled by a processing circuit (e.g., a general-purpose processor) in the manner of the known technique. In order to achieve the above-mentioned purpose of using the event counter 120 flexibly, the present invention discloses another counting circuit as shown in FIG. 2. In comparison with FIG. 1, the counting circuit 200 of FIG. 2 further includes a multiplexer 210. The multiplexer 210 is configured to receive one or more event signals $EV^1$, $EV^2$, . . . (e.g., user-defined signal or system-defined signal) and receive the trigger signal OV so as to output one of the trigger signal and the one or more event signals to the event counter 120 according to a selection signal SEL. When the multiplexer 210 outputs one of the one or more event signals to the event counter 120 according to the selection signal SEL, the event counter 120 operates according to the event signal it receives and operates in a manner independent of the operation of the cycle counter 110. When the multiplexer 210 outputs the trigger signal OV to the event counter 120 according to the selection signal SEL, the event counter 120 counts according to the change of the level of the trigger signal OV in the enablement duration and thereby works in conjunction with the cycle counter 110 to realize a counter with a greater count maximum.

Figure 3:
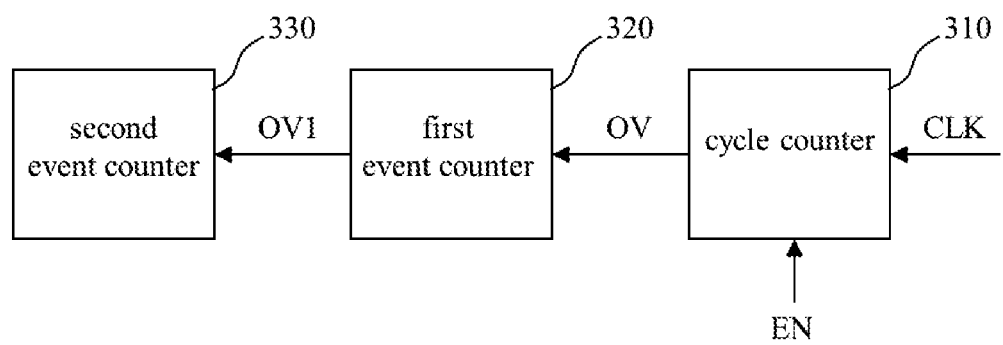
FIG. 3 shows the counting circuit of the PMU according to yet another embodiment of the present invention.

In some specific circumstances (e.g., the frequency of the clock signal CLK is extremely high and/or the enablement duration is extremely long), the overflow of the event counter 120 may occur and cause problems. In light of the above, the present invention discloses another counting circuit as shown in FIG. 3. The counting circuit 300 of FIG. 3 includes a cycle counter 310, a first event counter 320 and a second event counter 330. These counters 310, 320, 330 are connected in a predetermined manner (e.g., in series). An embodiment of the cycle counter 310 is an N-bit counter, an embodiment of the first event counter 320 is an M-bit counter, and an embodiment of the second event counter 330 is a K-bit counter, in which the N, the M and the K are positive integers that are associated with the count maximum of the cycle counter 310, the count maximum of the first event counter 320 and the count maximum of the second event counter 330 respectively. In an exemplary implementation, the N is greater than each of the M and the K, the N is not less than 32 and the M is equal to the K not less than 16. In another exemplary implementation, the N is 32 and both the M and the K are 16. It should be noted that the counting circuit 300 can optionally include other counters (e.g., other event counters) for more kinds of utilization.

Please refer to FIG. 3. The cycle counter 310 is configured to start counting from a beginning number according to a cycle of a clock signal CLK during enablement duration, wherein when a count of the cycle counter 310 reaches a count maximum of the cycle counter 310, the cycle counter 310 is configured to change a level of a trigger signal OV (e.g., the value of an overflow bit of the cycle counter 310) and count from a predetermined number (e.g., zero). The first event counter 320 is configured to start counting from a first number (e.g., any of a 16-bit value such as the minimum of the 16-bit value) according to the change of the level of the trigger signal OV during the enablement duration, wherein when a count of the first event counter 320 reaches a count maximum of the first event counter 320, the first event counter 320 is configured to change a level of a first signal OV1 (e.g., the value of an overflow bit of the first event counter 320 which is not one of the bits of the first event counter 320 for count operation (e.g., the aforementioned M-bit)) and then count from another predetermined number (e.g., zero). The second event counter 330 is configured to start counting from a second number according to the change of the level of the first signal OV1 during the enablement duration so that the counting circuit 300 is operable to obtain a total cycle number of the clock signal CLK in the enablement duration according to the count of the cycle counter 310, the count of the first event counter 320 and a count of the second event counter 330. For instance, providing the count maximum of the cycle counter 310 is $CYCT_{MAX}$, the count maximum of the first event counter 320 is $EV1_{MAX}$, and each of the beginning number, the predetermined number and the another predetermined number is zero, at the end of the enablement duration the total cycle number $CLK_{TOTAL\#}$ of the clock signal CLK is "the count of the cycle counter 310 (i.e., $CYCT_{CNT}$)" plus "the count of the first event counter 320 (i.e., $EV1_{CNT}$) times the count maximum of the cycle counter 310 (i.e., $CYCT_{MAX}$)" and plus "the count of the second event counter 330 (i.e., $EV2_{CNT}$) times the count maximum of the first event counter 320 (i.e., $EV1_{MAX}$) and times the count maximum of the cycle counter 310 (i.e., $CYCT_{MAX}$)", that is to say $CLK_{TOTAL\#}=CYCT_{CNT}+CYCT_{MAX}\times(EV1_{CNT}+EV2_{CNT}\times EV1_{MAX})$. It should be noted that in response to the finish of the enablement duration, the cycle counter 310, the first event counter 320 and the second event counter 330 can be reset and prepared for the next count operation. The said reset operation is well known in this industrial field and its detail is omitted here.

Figure 4:
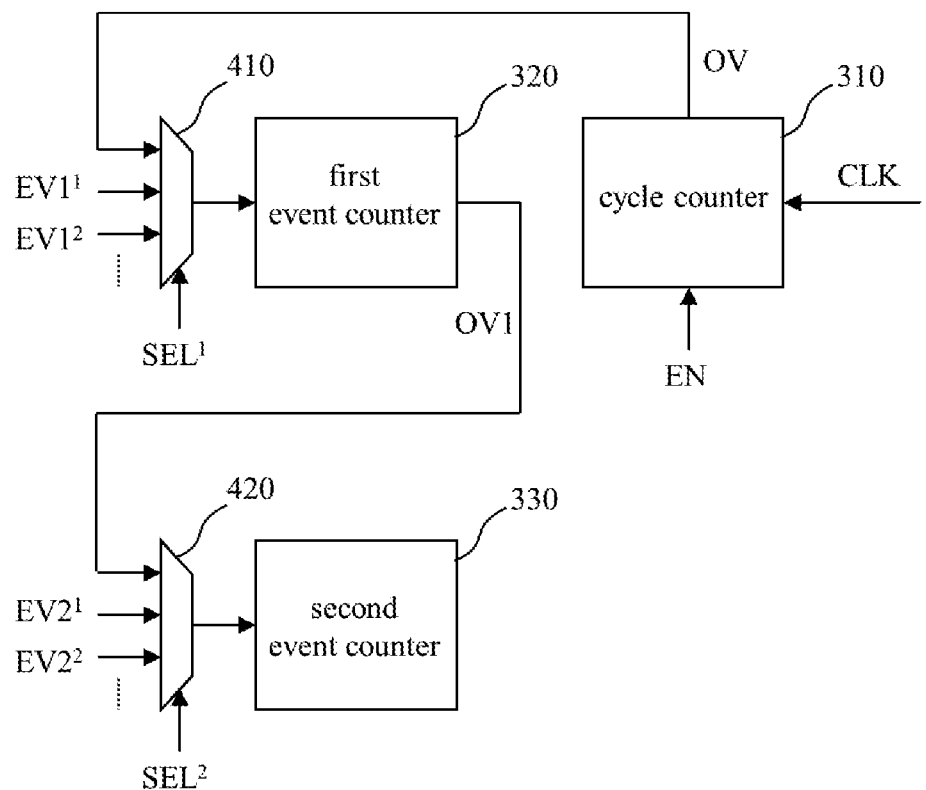
FIG. 4 shows the counting circuit of the PMU according to yet another embodiment of the present invention.

Please refer to FIG. 3. In some circumstances, the total cycle number of the clock signal CLK in the enablement duration is likely to exceed the count maximum of the cycle counter 310; in the meantime, the cycle counter 310 and the first event counter 320 cooperate to count to prevent the overflow of the cycle counter 310 from causing problems while the second event counter 330 can join in the count operation or operate independently. In some circumstances, the total cycle number of the clock signal CLK in the enablement duration is likely to exceed the count maximum of the union of the cycle counter 310 and the first event counter 320; in the meantime, the cycle counter 310, the first event counter 320 and the second event counter 320 cooperate to count to prevent the overflow of the first event counter 320 from causing problems. In some circumstances, the total cycle number of the clock signal CLK is unlikely to exceed the count maximum of the cycle counter 310 or the first event counter 320 has been assigned to other operation; in the meantime, the cycle counter 310, the first event counter 320 and the second event counter 330 operate separately. In order to achieve the purpose of using the event counters flexibly, the present invention discloses another counting circuit as shown in FIG. 4. In comparison with FIG. 3, the counting circuit 400 of FIG. 4 further includes a first multiplexer 410 and a second multiplexer 420. The first multiplexer 410 is configured to receive one or more first event signals $EV1^1$, $EV1^2$, . . . and receive the trigger signal OV so as to output one of the trigger signal and the one or more first event signals to the first event counter 320 according to a first selection signal $SEL^1$; accordingly, the first event counter 320 can cooperate with the cycle counter 310 or operate in a manner independent of the cycle counter 310 according to the signal outputted by the first multiplexer 410. The second multiplexer 420 is configured to receive one or more second event signals $EV2^1$, $EV2^2$, . . . and receive the first signal OV1 so as to output one of the first signal and the one or more second event signals to the second event counter 330 according to a second selection signal $SEL^2$; accordingly, the second event counter 330 can cooperate with the cycle counter 310 and the first event counter 320 or operate in a manner independent of the cycle counter 310 and the first event counter 320 according to the signal outputted by the second multiplexer 420. It should be noted that when the first event counter 320 is exclusively for counting with the cycle counter 310, the first multiplexer 410 is negligible.

It should be noted that people of ordinary skill in the art can implement the present invention by selectively using some or all of the features of any embodiment in this specification or selectively using some or all of the features of multiple embodiments in this specification as long as such implementation is practicable, which implies that the present invention can be carried out flexibly. In addition, those of ordinary skill in the art can appreciate how to have more event counters cooperate with a cycle counter to count in accordance with the present disclosure; therefore, repeated and redundant description is omitted here.

To sum up, the counting circuit of the present invention can prevent the suspension of count operation caused by an overflow and thereby provide an accurate result of the count operation. Furthermore, in the present invention the event counter of the counting circuit can operate according to the trigger signal from the cycle counter of the counting circuit or operate according to an event signal so that the usage of the event counter can be flexible.

The aforementioned descriptions represent merely the preferred embodiments of the present invention, without any intention to limit the scope of the present invention thereto. Various equivalent changes, alterations, or modifications based on the claims of present invention are all consequently viewed as being embraced by the scope of the present invention.

What is claimed is:

1. A counting circuit of a performance monitor unit (PMU), comprising:
   a cycle counter configured to start counting from a beginning number according to a cycle of a clock signal during enablement duration, wherein when a count of the cycle counter reaches a count maximum of the cycle counter during the enablement duration, the cycle counter is configured to change a level of a trigger signal and then count from a predetermined number; and
   an event counter configured to count according to change of the level of the trigger signal during the enablement duration so that the counting circuit is operable to obtain a total cycle number of the clock signal in the enablement duration according to the count of the cycle counter and a count of the event counter.

2. The counting circuit of the PMU of claim 1, wherein the cycle counter and the event counter are connected in series.

3. The counting circuit of the PMU of claim 1, wherein the cycle counter is an N-bit counter, the event counter is an M-bit counter, each of the N and the M is a positive integer, and the N is greater than the M.

4. The counting circuit of the PMU of claim 3, wherein the N is not less than 32 and the M is not less than 16.

5. The counting circuit of the PMU of claim 1, further comprising:
   a multiplexer configured to receive at least one event signal and the trigger signal and output one of the trigger signal and the at least one event signal to the event counter according to a selection signal.

6. The counting circuit of the PMU of claim 1, wherein the cycle counter includes an overflow bit as the trigger signal and a value of the overflow bit changes in response to the count of the cycle counter reaching the count maximum of the cycle counter during the enablement duration.

7. The counting circuit of the PMU of claim 1, wherein the predetermined number is zero.

8. A counting circuit of a performance monitor unit (PMU), comprising:
   a cycle counter configured to start counting from a beginning number according to a cycle of a clock signal during enablement duration, wherein when a count of the cycle counter reaches a count maximum of the cycle counter, the cycle counter is configured to change a level of a trigger signal and then count from a predetermined number;
   a first event counter configured to start counting from a first number according to the trigger signal during the enablement duration, wherein when a count of the first event counter reaches a count maximum of the first event counter, the first event counter is configured to change a level of a first signal and then count from another predetermined number; and a second event counter configured to start counting from a second number according to the first signal during the enablement duration so that the counting circuit is operable to obtain a total cycle number of the clock signal in the enablement duration according to the count of the cycle counter, the count of the first event counter and a count of the second event counter.

9. The counting circuit of the PMU of claim 8, wherein the cycle counter, the first event counter and the second event counter are connected in series.

10. The counting circuit of the PMU of claim 8, wherein the count maximum of the cycle counter is greater than each of the count maximums of the first event counter and the second event counter.

11. The counting circuit of the PMU of claim 10, wherein the cycle counter is an N-bit counter, each of the first event counter and the second event counter is an M-bit counter, each of the N and the M is a positive integer, and the N is greater than the M.

12. The counting circuit of the PMU of claim 8, further comprising:

a first multiplexer configured to receive at least one first event signal and the trigger signal and output one of the trigger signal and the at least one first event signal to the first event counter according to a first selection signal; and a second multiplexer configured to receive at least one second event signal and the first signal and output one of the first signal and the at least one second event signal to the second event counter according to a second selection signal.

13. The counting circuit of the PMU of claim 8, wherein the cycle counter includes an overflow bit as the trigger signal and the first event counter includes another overflow bit as the first signal.

14. The counting circuit of the PMU of claim 8, wherein both the predetermined number and the another predetermined number are zero.

15. A counting circuit of a performance monitor unit (PMU), comprising:

a cycle counter configured to count according to a cycle of a clock signal and output a trigger signal to a multiplexer; and the multiplexer configured to receiver at least one event signal and the trigger signal and output one of the trigger signal and the at least one event signal to an event counter according to a selection signal; and the event counter configured to operate in a manner independent of the cycle counter when the multiplexer outputs any of the at least one event signal, and the event counter configured to count according to change of a level of the trigger signal when the multiplexer outputs the trigger signal.

16. The counting circuit of the PMU of claim 15, wherein the cycle counter, the multiplexer and the event counter are connected in series.

17. The counting circuit of the PMU of claim 15, wherein a count maximum of the cycle counter is greater than a count maximum of the event counter.

18. The counting circuit of the PMU of claim 15, wherein the clock signal is a clock signal of a processor.

* * * * *